US007056408B2

(12) United States Patent
Whitman

(10) Patent No.: US 7,056,408 B2
(45) Date of Patent: Jun. 6, 2006

(54) HIGH PERFORMANCE ADHESIVE

(75) Inventor: David William Whitman, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 130 days.

(21) Appl. No.: 10/651,196

(22) Filed: Aug. 28, 2003

(65) Prior Publication Data

US 2004/0045662 A1 Mar. 11, 2004

Related U.S. Application Data

(60) Provisional application No. 60/409,780, filed on Sep. 11, 2002.

(51) Int. Cl.

| | |
|---|---|
| ***B32B 27/30*** | (2006.01) |
| ***B32B 37/12*** | (2006.01) |
| ***B29C 65/02*** | (2006.01) |
| ***B29C 65/14*** | (2006.01) |

(52) U.S. Cl. .............................. 156/275.7; 428/423.1; 428/500; 522/116; 522/117; 522/120; 522/114

(58) Field of Classification Search ................ 522/116, 522/117, 120; 428/423.1, 500; 156/275.7
See application file for complete search history.

(56) References Cited

U.S. PATENT DOCUMENTS 3,773,710 A * 11/1973 Victorius .................... 524/512
4,720,317 A * 1/1988 Kuroda et al. .............. 156/250
5,202,361 A * 4/1993 Zimmerman et al. ....... 522/120
5,384,341 A * 1/1995 Itagaki et al. ............... 522/111
5,747,551 A 5/1998 Lewandowski et al.
5,900,473 A 5/1999 Huber et al.
5,955,512 A * 9/1999 Numazawa et al. .......... 522/95
5,997,682 A 12/1999 Goodman et al.
6,069,219 A 5/2000 McCormick et al.
6,191,184 B1 * 2/2001 Suzuki et al. ................. 522/79
6,608,143 B1 * 8/2003 Fukuoka et al. ............ 525/309

FOREIGN PATENT DOCUMENTS

EP 0 263 686 4/1988
EP 0 264 705 4/1988
EP 0 340 906 11/1989
JP 59105068 6/1985

OTHER PUBLICATIONS

PTO Translation in English of JP 59-105068 to Koji Nakamoto, published Jun. 1985.*

* cited by examiner

*Primary Examiner*—Susan Berman
(74) *Attorney, Agent, or Firm*—Carl P. Henenway

(57) ABSTRACT

A method is provided for bonding substrates using a homogeneous fluid and a polymerizing condition. Also provided are composite articles formed by such a method. The composite articles show improved adhesion between the substrates and the adhesive composition over a wide range of temperatures.

9 Claims, No Drawings

HIGH PERFORMANCE ADHESIVE

CROSS-REFERENCE TO RELATED APPLICATIONS

This is a Non-Provisional U.S. Patent Application of U.S. Provisional Application No. 60/409,780, filed Sep. 11, 2002.

BACKGROUND

This invention relates to a method of preparing a composite article, to a composite article formed thereby, and to an adhesive composition useful for forming such composite articles. In particular, the method of this invention includes forming an uncured assembly containing substrates and a homogeneous fluid and then exposing the assembly to polymerization conditions. Composite articles are prepared by bonding two or more substrates together with an interposed polymeric adhesive composition. The composite articles desirably have good adhesive strength; that is, the polymeric adhesive composition must adhere well to the substrates and be resistant to forces that lead to separation. Especially desirable are composite articles with good adhesive strength over a wide range of temperatures.

Some composite articles are made of relatively thin, flat layers; such composite articles are generally known as laminates. The method of this invention is useful for preparing various types of composite articles, including laminates, especially flexible laminates. Laminates are used to provide packaging which is light-weight and flexible. Typically, laminates are formed from combinations of various polymeric films, including, for example, polymeric substrates with low surface energies, bonded by a bonding composition to identical polymeric films, to different films, and/or to metal foils. It is desirable to use the bonding composition at a low application weight to minimize the weight of the laminate, to maintain flexibility, and to minimize cost.

New bonding methods are desired which allow the preparation of composite articles from opaque substrates. Multilayered composite articles are also desired which may be formed with a single cure step. One approach to these goals has been to bond the substrates with a bonding composition that is applied as a liquid and then exposed to elevated temperature or to radiation such as, for example, ultraviolet (uv) radiation or electron beam (e-beam) radiation. However, cure with uv radiation often requires the use of photoinitiators, and photoinitiators or the fragments of photoinitiators resulting from photolysis are generally low molecular weight materials which may adversely affect the properties of the composite article. Compositions that are curable by exposure to electron beam radiation generally do not require photoinitiators.

Adhesives cured by radiation have been disclosed by U.S. Pat. No. 5,747,551. However, such composite articles, while they often have good adhesive strength at room temperature, are known to lack good adhesive strength at elevated temperature. An object of the present invention is to provide composite articles with good adhesive strength at a wide range of temperatures.

STATEMENT OF THE INVENTION

In a first aspect of the present invention, there is provided a composite article comprising a first substrate, a polymeric adhesive composition displaying at least two glass transition temperatures, and at least one subsequent substrate, wherein said composite article is formed by a process comprising:

(a) applying a layer of a homogeneous fluid comprising at least one polymerizable compound to said first substrate, (b) contacting said layer to said subsequent substrate to form an uncured assembly, and (d) exposing said uncured assembly to at least one polymerization condition selected from the group consisting of elevated temperature, radiation, and combinations thereof.

In a second aspect of the present invention, there is provided a method for forming a composite article comprising (a) applying a layer of a homogeneous fluid comprising at least one polymerizable compound to at least one first substrate, (b) contacting said layer to at least one subsequent substrate to form an uncured assembly, and (d) exposing said uncured assembly to at least one polymerization condition selected from the group consisting of elevated temperature, radiation, and combinations thereof;

wherein, subsequent to exposure of said uncured assembly to said polymerization condition, a polymeric adhesive composition displaying at least two glass transition temperatures has formed, wherein the weight of said polymeric adhesive composition is at least 10% of the weight of said layer of said fluid in said uncured assembly.

In a third aspect of the present invention, there is provided a homogeneous fluid comprising at least one polymerizable compound, wherein said fluid is capable, after exposure to at least one polymerization condition selected from the group consisting of elevated temperature, radiation, and combinations thereof, of forming a polymeric adhesive composition displaying at least two glass transition temperatures.

DETAILED DESCRIPTION

As used herein, "(meth)acrylic" means acrylic or methacrylic, and "(meth)acrylate" means acrylate or methacrylate.

As used herein, "glass transition temperature" or "Tg" is the temperature at which a polymeric substance changes from a glassy state to a rubbery state, as described for example by J. J. Aklonis and W. J. MacKnight in *Introduction to Polymer Viscoelasticity*, second edition, published by Wiley-Interscience, 1983. As used herein, Tg is identified by dynamic mechanical analysis ("DMA") as a peak in a plot of loss tangent (also called tan(delta) or tan ($\delta$) or tan $\delta$) vs. temperature. The plots of tan(delta) vs. temperature refer to DMA performed at a single frequency; if multiple peaks are present, that fact will be evident regardless of the specific single frequency used for performing the DMA test. Typical frequencies used in DMA testing range from 0.01 Hz to 10,000 Hz. The tests discussed herein were performed at 1 Hz (1 cycle/sec). Peaks in plots of tan(delta) vs. temperature will be called "loss tangent peaks" herein. The DMA may be performed on a pure polymer or on a composite article.

The practice of the present invention includes the use of a homogeneous fluid. By "fluid" is meant a liquid with viscosity of 10 Pa·s (10,000 cps) or less at 60° C., as measured by standard methods, for example using Brookfield viscometer model DVI with a #25 spindle. Liquids with viscosity of 10 Pa·s (10,000 cps) or less at lower temperatures (for example, 20° C.) are assumed to have even lower viscosity at 60° C. than they have at such lower temperature, and so they are considered as "fluid" herein. Typical fluids suitable for use in the present invention have viscosity of 0.1 to 6 Pa·s (100 to 6,000 cps) at 60° C. By "homogeneous" is meant herein a fluid that appears, on visual inspection, to be a uniform solution; the homogeneous fluid may have a uniform color or be transparent, but it will be free of layers, suspensions, or other visible signs of phase separation.

The homogeneous fluid of the present invention contains one or more polymerizable compounds. Suitable polymerizable compounds may be monomers, oligomers, resins, polymers, or mixtures thereof. Monomers are polymerizable compounds with relatively low molecular weight, usually 1,000 or less. Oligomers are linear, branched, or star-structured compounds of 2 to 10 monomer units; molecular weights of oligomers vary according to the molecular weight of the monomer units, but typical oligomers have molecular weights (Mn, or number-average molecular weight, as measured by gel permeation chromatography) of 10,000 or less. Polymers are linear, branched, comb-structured, star-structured, or crosslinked compounds of 11 or more monomer units, typically with Mn of more than 10,000. The term "resin" is used to mean either a polymer or an oligomer. For any oligomer, resin, or polymer to function as polymerizable compound, it must be capable of further polymerization during or after exposure to polymerization conditions. Each molecule of suitable polymerizable compound may have one or more reactive groups capable of participating in a polymerization reaction.

Preferred are polymerizable compounds with low volatility. Generally, compounds with relatively high boiling points are believed to have low volatility. Preferred as polymerizable compounds in the present invention are compounds with boiling point of 60° C. or above; more preferably 80° C. or above; even more preferably 100° C. or above, and most preferably 120° C. or above.

A preferred class of compounds suitable for use in the present invention as polymerizable compound are acrylic compounds, which are any compounds containing (meth) acrylic groups. Suitable acrylic compounds include, for example, (meth)acrylic acid, esters of (meth)acrylic acid, adducts of (meth)acrylic acid and/or (meth)acrylate esters with other functional compounds, and mixtures thereof. Among the esters of (meth)acrylic acid that are suitable for use as polymerizable compound are, for example, alkyl esters of (meth)acrylic acid; hydroxyl containing esters of (meth)acrylic acid such as for example hydroxyethyl (meth) acrylate; ring containing esters of (meth)acrylic acid such as for example isobornyl (meth)acrylate; esters of (meth) acrylic acid containing other groups such as for example ethylene oxide, allyl groups, glycidyl groups, and the like; and mixtures thereof.

Also among the acrylic compounds suitable for use in the present invention as polymerizable compound are acrylic compounds that have tertiary alkyl amide functionality. One group of suitable acrylic compounds that have tertiary alkyl amide functionality is the group of substituted (meth)acrylamides that have the following structure:

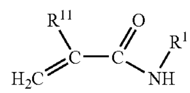

where $R^{11}$ is either hydrogen or methyl, and $R^1$ is

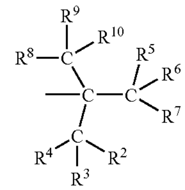

where $R^2$–$R^{10}$ are, independently, hydrogen or organic groups. The carbon atom of $R^1$ that is attached to the amide nitrogen is a tertiary alkyl carbon atom, so the functional group is said to have "tertiary-alkyl amide functionality." If any of $R^2$–$R^{10}$ are organic groups, they may be independently alkyl, cycloalkyl, aryl, alkylaryl, unsaturated, and/or substituted with one or more halogen, amide, sulfonic, carbonyl, or other groups. Preferred acrylic compounds that have tertiary-alkyl amide functionality are 2-acrylamido 2-methylpropane sulfonic acid, diacetone (meth)acrylamide, N-tert-butyl (meth)acrylamide, N-tert-octyl (meth)acrylamide, and mixtures thereof; more preferred are diacetone acrylamide, N-tert-butyl acrylamide, and mixtures thereof.

Additionally among the acrylic compounds suitable as polymerizable compound for use in the present invention are esters of (meth)acrylic acid or other substituted acrylic acid compounds with polyols, such as for example esters of (meth)acrylic acid with polyols, including esters of (meth) acrylic acid with alkoxylated polyols. Some suitable esters of (meth)acrylic acid with alkoxylated polyols include, for example, esters of (meth)acrylic acid with ethoxylated pentaerythritol, propoxylated pentaerythritol, ethoxylated trimethylolpropane, propoxylated trimethylolpropane, ethoxylated hexane diols, propoxylated hexane diols, similar polyols in which some hydroxyls are ethoxylated and other hydroxyls are propoxylated, and mixtures thereof.

Further additionally included in the class of acrylic compounds suitable for use as polymerizable compounds of the present invention are adducts of any of the above acrylic compounds with other functional compounds such as for example epoxy compounds, isocyanates, or phosphate compounds. Examples of adducts of acrylic compounds with other functional compounds that are suitable as a polymerizable compound include, for example, epoxy (meth)acrylates, the adducts of alkyl isocyanates with hydroxyalkyl (meth)acrylates, and (meth)acrylate-terminated phosphate esters. Some adducts known to be suitable as a polymerizable compound are, for example, Ebecryl™ CL 1039, a urethane monoacrylate monomer supplied by UCB chemicals; and Ebecryl™ 111, an epoxy monoacrylate monomer supplied by UCB chemicals.

Yet another group of acrylic compounds suitable for use in the present invention as polymerizable compounds are acrylic oligomers: that is, oligomers made fully or partially from (meth)acrylic monomers. Some suitable such oligomers may be made by reacting one or more acrylic monomers with each other to form an oligomer. Other suitable acrylic oligomers may be made by reacting one or more acrylic monomers with other compounds to form suitable oligomers. When oligomers are used, preferred are those obtained by reaction of one or more (meth)acrylic acid, (meth)acryloyl halide, and/or (meth)acrylate ester with one or more of hydroxy-containing alkyd resins, polyester condensates, or polyether condensates, as disclosed in U.S. patent application Ser. No. 10/135,258.

Compounds are suitable for use in the present invention because of their chemical structure, regardless of the method of synthesis or manufacture. Consequently, it is to be understood that, in the descriptions herein of chemical compounds, words like "esterified" and "adducts" and "ethoxylated" are used to describe chemical structures, regardless of the method of making those chemicals.

In addition to (meth)acrylate compounds, other polymerizable compounds are suitable for use in the present invention as polymerizable compound. Suitable compounds include for example ethylenically unsaturated compounds such as vinyl acetate, derivatives of vinyl acetate, substituted vinyl acetate compounds, styrene, substituted styrenes such as alpha-methyl styrene, and mixtures thereof Also suitable are other compounds that are able to polymerize or copolymerize during or after exposure to electron beam radiation such as for example urethanes, epoxies, anhydrides, compounds capable of ring-opening polymerization, and mixtures thereof.

Another group of compounds suitable for use in the present invention as polymerizable compounds are polymers capable of further curing when exposed to polymerization conditions. One group of such polymers have one or two terminal ethylenically unsaturated groups; some water-insoluble examples of such polymers are disclosed in U.S. patent application Ser. No. 09/951,924.

Any mixtures of polymerizable compounds suitable for use in the present invention will also be suitable as polymerizable compound. Preferred polymerizable compounds are monomers, oligomers, and mixtures thereof; more preferred are polymerizable compounds that contain only monomers and oligomers. Also preferred are polymerizable compounds that contain only acrylic compounds.

The homogeneous fluid of the present invention may also contain compounds in addition to polymerizable compounds. Examples of additional compounds include polymers; resins; diluents; solvents; and additives that improve the flow of the composition, that help the composition wet the substrate, that reduce foaming, or that adjust the viscosity of the composition. Preferred are homogeneous fluids that use little or no solvent. Also preferred are homogeneous fluids with high solids level. The solids level is the sum of the weights of all polymerizable compounds and all solid ingredients, expressed as a percentage of the total weight of the homogeneous fluid. Solid ingredients are those that, in pure form, are solid at 25° C. The solids level of the homogeneous fluid is preferably 50% or higher; more preferably 75% or higher; even more preferably 95% or higher, and most preferably 99% or higher.

One useful class of additional compounds that may be included in the homogeneous fluid of some embodiments of the present invention are wetting agents, i.e., those believed to improve the ability of the composition to wet the substrate; one class of wetting agents is polyether-modified polydimethyl siloxane compounds. Wetting agents, when they are used, are generally used at levels of 2% or less by weight based on the weight of the homogeneous fluid; preferred are levels of 1% or less. When wetting agents are used, they are generally used at levels of 0.01% or more by weight based on the weight of the homogeneous fluid; preferred are levels of 0.1% or more.

Another class of additional compounds that may be included in the practice of the present invention is the class of tackifying resins, as disclosed in U.S. patent application Ser. No. 10/135,258. Tackifying resins are rosins, hydrogenated rosins, terpene resins, esters thereof, polymers thereof, and derivatives thereof In the present invention, preferred homogeneous fluids do not include tackifying resins.

Additionally, a further class of additional compounds that may be included in the homogeneous fluid of the present invention is the class of polymers. Polymers may be polymerizable compounds or they may be non-reactive when exposed to the polymerization conditions of the present invention. A wide variety of polymer compositions are suitable, as long as the polymer is sufficiently compatible with the other ingredients so that the combination of ingredients forms a homogeneous fluid, and as long as the composite article that is present after the exposure to polymerization conditions has two or more Tg's. Some polymer compositions that may be suitable include, for example, polyesters, polyurethanes, (meth)acrylate polymers, vinyl polymers, polyolefins, copolymers thereof, and mixtures thereof Preferred are acrylic polymers (ie., polymers made from monomer mixtures that are 50% to 100% by weight acrylic compounds); more preferred are acrylic polymers made from monomer mixtures that are 90% to 100% acrylic compounds. Also preferred are polymers with Mn of 50,000 or greater. One acrylic polymer known to be suitable is Acryloid™ B-67, available from the Rohm and Haas Company.

The ingredients of the homogeneous fluid of the present invention may be combined by any means. Usually, the ingredients are brought together in a container with stirring. Preferably, the ingredients are combined in such a way as to make a uniform solution. The ingredients may be heated in order to improve or speed up the process of making a homogeneous fluid. It is contemplated that the ingredients will be chosen and the temperature of combining the ingredients will be chosen to minimize or prevent any polymerization from taking place in the homogeneous fluid during the combining of the ingredients; after the combining of ingredients, with or without heating, the combination of ingredients will still be a homogeneous fluid. Typically, if the ingredients are heated to improve mixing, temperatures of 60° C. or less are used.

In the homogeneous fluid of the present invention, a preferred amount of polymerizable compound is 50% or more by weight based on the weight of the homogeneous fluid; more preferred is 65% or more; even more preferred is 75% or more. Also suitable are amounts of polymerizable compound that are 100% or less by weight, based on the weight of the homogeneous fluid; preferred is 90% or less; more preferred is 85% or less.

In the practice of the present invention, the homogeneous fluid is applied onto a substrate. Application may be performed by any means, including for example, manual or mechanical spreading. Suitable application methods include for example roll coating, rod coating, gravure, Meyer bar, and the like. The homogeneous fluid may be applied at room temperature (20 to 25° C.) or it may be applied hot (i.e., at a temperature above room temperature); typically, hot application is performed if it is desired to reduce the viscosity of the homogeneous fluid to improve the operation of the application method. If hot application is used, the temperature is chosen to prevent or minimize polymerization during application of the homogeneous fluid; if hot application is performed, it is generally performed at 70° C. or lower. The applied homogeneous fluid may form a continuous or discontinuous layer. The thickness of the applied layer of homogeneous fluid may be uniform or it may vary. The amount of homogeneous fluid that is applied to the substrate will depend on the substrates and on the use to which the composite article will be put. In some embodiments, a preferable amount of applied homogeneous fluid is at least 0.32 $g/m^2$ (0.2 lb/ream); more preferable is at least 1.1 $g/m^2$ (0.7 lb/ream); still more preferable is at least 1.5 $g/m^2$ (0.9 lb/ream). Also, in some embodiments, a preferable amount of applied homogeneous fluid is 4.5 $g/m^2$ (3 lb/ream) or less; more preferable is 2.1 $g/m^2$ (1.3 lb/ream) or less, and still more preferable is 1.8 $g/m^2$ (1.1 lb/ream) or less.

Those skilled in the art will recognize that the most desirable viscosity for the homogeneous fluid will depend on the choice of coating method. For use with a roll coater, preferred viscosity is 1.0 to 5.0 Pa·s (1,000 to 5,000 cps).

In the practice of the present invention, after the homogeneous fluid is applied to a first substrate, it is contacted with a subsequent substrate to form an uncured assembly, which is optionally subjected to applied pressure such as by passing it between rollers to effect increased contact of the substrates with the homogeneous fluid. In another embodiment the homogeneous fluid may be simultaneously or sequentially applied to two surfaces of a first substrate, which coated surfaces are then simultaneously or sequentially bonded to two subsequent substrates, which may be the same or different relative to the first substrate and each other. It is further contemplated that the composite article may subsequently be bonded to one or more other substrates using the same or a different adhesive before or after the process described herein. Also, it is contemplated that a wide variety of arrangements of substrates and polymeric adhesive layers may be used to form the composite article. For example, multiple substrates may be alternated with multiple layers of adhesive, such as for example in multilayered laminates. For another example, in some embodiments, layers of homogeneous fluid, each applied to its own substrate, may be brought together.

The substrates to be bonded in the method of this invention may be the same or different and include, for example, metal, wood, paper, elastomers, woven and nonwoven fabrics, and plastics which may have smooth or textured surfaces and are provided in the form of rolls, sheets, films, foils, etc. Suitable substrates include for example plywood, paper, impregnated paper, polystyrene foam, polyester film, polyester fabric, aluminum, steel, polyvinyl chloride, natural and synthetic rubber, polymer blends, and engineering plastics.

In some embodiments of the present invention, the substrates that are bonded are relatively thin and flat, and in such cases the composite article is called a laminate or laminated structure. Some flat substrates known to be suitable for the practice of the present invention include for example untreated polyethylene terephthalate (PET) films, PET films treated by corona discharge, PET films with chemically treated surface, polyethylene films, including low density polyethylene films, and metalized polymer films.

Photoinitiators are compounds that do not participate in polymerization but that form one or more radicals when exposed to radiation. Generally, photoinitiators are not needed in compositions that are cured by exposure to electron beam radiation. In the practice of the present invention, photoinitiators may be included in the homogeneous fluid of the present invention. However, preferred homogeneous fluids contain amounts of photoinitator that are so low as to be ineffective; that is, any photoinitiator present is so dilute as to have no appreciable effect on the cured composite article; more preferred are homogeneous fluids that contain no photoinitiator.

In the practice of the present invention, the uncured assembly is subjected to one or more polymerization conditions. In some embodiments, these conditions cause some or all of the homogeneous fluid to cure (i.e., to react chemically to become a polymer). Suitable minimum extent of polymerization conditions is an extent sufficient to create a bond strength that is useful and to reduce the amount of non-polymerized material to acceptable levels. One measure of extent of polymerization is the conversion of monomer to polymer, defined herein as the weight of monomer in the homogeneous fluid that is chemically bound to a polymeric species or to substrate in the composite article, as a percentage of the weight of monomer in the homogeneous fluid. Preferred extent of polymerizations are 10% or greater; more preferred are 50% or greater; still more preferred is 75% or greater; even still more preferred is 90% or greater, and most preferred is 95% or greater. The preferred polymerization conditions are elevated temperature, ultraviolet (UV) radiation, electron beam radiation, and mixtures thereof.

When elevated temperature is used as all or part of the polymerization condition of the present invention, suitable temperatures are 70° C. or higher; preferred is 80° C. or higher. Also preferred are temperatures low enough to avoid any substantial degradation of the composite article; preferred is 200° C. or lower; more preferred is 150° C. or lower; even more preferred is 100° C. or lower. The elevated temperature is maintained for duration long enough to achieve the desired properties of the composite article; duration of elevated temperature generally will be shorter if higher temperatures are used. Preferred durations are 5 minutes or longer; more preferred is 30 minutes or longer; even more preferred is 1 hour or longer. Suitable durations are also 2 days or less; preferred is 1 day or less; more preferred is 10 hours or less. One combination of temperature and duration believed to be suitable is, for example, 80° C. for 6 hours. When elevated temperature is used, a thermal initiator (i.e., a compound that, when heated, forms one or more moieties that can initiate polymerization) is generally included in the homogeneous fluid. Suitable initiators include, for example, 2,2'-azobis-(2-methylbutyronitrile).

When UV radiation is used as all or part of the polymerization condition of the present invention, a photoinitiator is generally included in the homogeneous fluid. One photoinitiator believed to be suitable is, for example, 2-hydroxy-2-methyl-1-phenyl-propan-1-one, available as Darocure™ 1173 from Ciba Specialty Chemicals Inc. A preferred dose range of UV radiation is 50 to 5,000 $mJ/cm^2$; more preferred is 200 to 2,000 $mJ/cm^2$.

When electron beam radiation is used as all or part of the polymerization condition of the present invention, the dose of radiation is measured in SI units called "gray," abbreviated Gy, equivalent to 1 Joule of energy per kilogram of irradiated material, as described in "An Introduction to Radiation Units and Measurement," by H. C. Biggin, in *Irradiation Effects on Polymers*, edited by D W Clegg et.al., Elsevier, 1991. One thousand gray units is one kilogray, or kGy. Another dosage unit is the rad, equivalent to 100 erg/gram; 1 Gy=100 rad. In some embodiments, 5 kGy, (0.5 Megarad, abbreviated Mrad) or greater is suitable; preferred is 10 kGy (1 Mrad) or greater; more preferred is 20 kGy (2 Mrad) or greater. Higher energy levels may be used, but they add extra expense and slow down the speed of production of bonded composite. In some embodiments, 200 kGy (20 Mrad) or less is suitable; preferred is 100 kGy (10 Mrad) or less; more preferred is 50 kGy (5 Mrad) or less.

In the practice of the present invention, the more preferred polymerization condition is electron beam radiation, elevated temperature, and combinations thereof; even more preferred is electron beam radiation. It is contemplated that when electron beam radiation is used as the polymerization condition, the materials may become warmer than room temperature due to hot application of the homogeneous fluid, to exothermic chemical reactions during cure, to conversion of radiation to heat, and/or to other causes.

While the present invention is not limited to any particular mechanism or chemical reaction, it is contemplated that, upon exposure to polymerization condition, the polymerizable compounds in the homogeneous fluid will polymerize. The polymerizable compounds may be monofunctional, multifunctional, or mixtures thereof, so that the polymers formed may be linear, branched, comb-structured, star-structured, and/or crosslinked. All such types of polymers are contemplated for use in the practice of the present invention. As used herein, "polymerization" refers to the chemical reaction of monomer molecules to form polymers; when multifunctional monomers are included, the polymerization process may also be referred to as "crosslinking." Polymerization, with or without crosslinking, is often referred to as "curing." In the practice of the present invention, it is contemplated that the homogeneous fluid, upon exposure to polymerization condition, may undergo any or all of polymerization, curing, and/or crosslinking.

In the practice of the present invention, the polymeric adhesive composition that is present in the composite article after exposure to polymerization conditions has two or more glass transition temperatures. One method of determining this result is to disassemble the composite article so that DMA may performed on a pure or nearly pure sample of the polymeric adhesive composition. Alternatively, the DMA testing may be performed on the composite article. When the composite article is tested, if any of the substrates are polymeric, loss tangent peaks for the polymer substrates may also be detected; using well known methods of analyzing DMA results, such peaks will be ignored, and the remaining peaks will be due to the Tg's of the polymeric adhesive composition.

The present invention is not limited to any particular theory, model, or mechanism. However, it has been observed that typical polymeric adhesive compositions that were in use previous to the present invention had a single Tg, and that these polymeric adhesive compositions showed the best results in adhesion testing at temperatures at or near that Tg. It is believed that some types of adhesion testing show the best results when the polymeric adhesive composition is able to absorb mechanical energy and dissipate it as heat, and this ability is generally thought to be highest under conditions that maximize the loss tangent of the polymeric adhesive composition. More recently, the present inventor has observed that a polymeric adhesive composition with multiple loss tangent peaks shows good results in adhesion tests over a broad range of temperatures.

In the practice of the present invention, preferred polymeric adhesive compositions show at least two clearly identifiable peaks in the curve of loss tangent vs. temperature. These two peaks correspond to two glass transition temperatures. Preferably, there will be two peaks separated by 10° C. or more; if other peaks are present, the other peaks may or may not be in between these two peaks. More preferably, there will be two peaks separated by 20° C. or more; if other peaks are present, the other peaks may or may not be in between these two peaks. It is contemplated that one or more of the loss tangent peaks may be present on a sloping baseline or may be a shoulder on another peak; any such peak constitutes a separate Tg in the practice of the present invention as long as it is clearly identifiable as a peak. Methods for identifying peaks are well known, as taught for example by P. R. Bevington and D. K. Robinson in *Data Reduction and Error Analysis for the Physical Sciences*, second edition, published by McGraw-Hill, 1992.

In the practice of the present invention, the preferred Tg values of the polymeric adhesive composition will sometimes depend on the intended temperature of use or testing of the composite article. In some preferred embodiments, one Tg is in the range of 20° C. to 50° C.; in these embodiments, the other Tg or Tg's may be in the same range or outside of it. Also preferred are polymeric adhesive compositions with one Tg in the range of 51° C. to 75° C., with the other Tg or Tg's either in the same range or outside of it. Also, some preferred embodiments have one Tg in the range of −10° C. to 19° C., with the other Tg or Tg's either in the same range or outside of it. For example, one preferred embodiment will have one Tg in the range of 20° C. to 50° C. and a second Tg in the range of 51° C. to 75° C. Similarly, another preferred embodiment will have one Tg in the range of 20° C. to 50° C. and a second Tg in the range of −10° C. to 19° C.

While the present invention is not limited to a particular mechanism or to a particular spatial arrangement of species within the polymeric adhesive composition, it is believed that the multiple Tg's occur because of some phase separation of polymer, with each phase manifesting its own characteristic Tg. In some situations, it is known in the art that phase separation of a mixture with two or more components can be inhibited or suppressed by the addition of one or more compatibilizing compounds. Typically, a compatibilizing compound is amphiphilic; that is, its molecule has at least two distinct parts, with one part compatible with one component and another part compatible with a different component.

Compatiblizing compounds include, for example, surfactants, polymerizable surfactants, polymers of amphiphilic compounds, block copolymers including diblock, triblock, and comb copolymers, and mixtures thereof. One class of compatiblizing compounds are fatty acrylates, which are acrylic compounds, as defined above, which also contain a hydrocarbon chain of at least 6 carbons; the hydrocarbon chain may be attached to the (meth)acrylic group through an ester linkage, urethane link, ether linkage, other links, or combinations thereof; the compatiblizing compound may have a complex structure with other substituents and/or functional groups. Compatiblizing compounds include, for example, alkyl esters of (meth)acrylic acid with alkyl groups of at least 6 carbon atoms, substituted alkyl esters of (meth)acrylic acid, acrylated fatty esters, acrylated fatty methyl esters, and mixtures thereof. Some examples of compatibilizing compounds include alkyl methacrylates with alkyl groups with at least 6 carbon atoms, acrylated oleic methyl ester, and mixtures thereof. In some cases, it is known that addition of a compatiblilizing compound will prevent the formation of multiple Tg's in the polymeric adhesive composition. In the practice of the present invention, it is preferred to include little or no compatiblizing compound in the homogeneous fluid; that is, it is preferred to have 0.2% or less by weight of a compatiblizing compound, based on the weight of the homogeneous fluid; more preferred is the absence of compatibilizing compound.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. It is also to be understood that limits that are separately recited can be combined in all combinations into ranges; for example, if lower limits of 1 and 2 are recited for a parameter, and if upper limits of 10 and 9 are recited for the same parameter, then all of the following ranges are contemplated as suitable for the practice of the present invention: 1 to 10, 1 to 9, 2 to 10, and 2 to 9.

In the Examples below, the following materials were used as received, without further purification:

| |
|---|
| Ebecryl ™ CL-1039 is a urethane monoacrylate monomer from UCB Chemicals |
| Ebecryl ™ 111 is an epoxy monoacrylate monomer from UCB Chemicals |
| Ebecryl ™ 230 is an aliphatic urethane diacrylate oligomer from UCB Chemicals is propoxylated trimethylolpropane triacrylate from Sartomer Company |
| SR-495 is a monofunctional acrylate monomer from Sartomer Company |
| Diacetone acrylamide and t-butyl acrylamide were obtained from Aldrich Chemicals. |
| AOME is acrylated oleic methyl ester from Cara Plastics. |
| Acryloid ™ B-67 is a 100% solids acrylic polymer from Rohm and Haas Company, with an approximate molecular weight of 90,000 g/mol. |
| Foral ™ NC is a hydrogenated rosin tackifier from Hercules Company |
| untreated PET film was 92 LBT from Dupont Teijin Films USA Ltd. |
| sealant film was 2 mil thick linear low density polyethylene |
| CD-501 is six mole propoxylated trimethylolpropane triacrylate, available from Sartomer |
| Darocur ™ 1173 is 2-hydroxy2-methyl-1-phenly-propan-1-one, available from Ciba Specialty Chemicals. |

EXAMPLES

Comparative Example C1

7.5 g of Ebecryl™ 230, 2.7 g of Ebecryl™ CL-1039, 2.7 g of SR-495, 0.6 g of CD-501 were charged to a small reactor and stirred mechanically as the temperature was raised to 60° C. 16.5 g of Foral™ NC was added while stirring continued. The mixture was stirred for one hour at 60° C. to produce a clear solution. The viscosity at 60° C. was 2.7 Pa·s (2,700 cps). The mixture was cooled to room temperature and used without further modification.

Comparative Example C2

6 g of Ebecryl™ 230, 6 g of Ebecryl™ CL-1039 and 0.6 g of CD-501 were charged to a small reactor and stirred mechanically as the temperature was raised to 60° C. 17.4 g of Foral™ NC was added while stirring continued. The mixture was stirred for one hour at 60° C. to produce a clear solution. The viscosity at 60° C. was 2.3 Pa·s (2,300 cps). The mixture was cooled to room temperature and used without further modification.

Example 3

12 g of Ebecryl™ CL-1039 and 6 g of Ebecryl™ 111 were charged to a small reactor and stirred mechanically as the temperature was raised to 60° C. 4.5 g of diacetone acrylamide and 1.5 g of t-butyl acrylamide were added while stirring continued. After dissolution was complete, 6 g of Acryloid™ B-67 was added with stirring. The mixture was stirred for one hour at 60° C. to produce a clear solution. After cooling to room temperature, the solution had a viscosity of 1.15 Pa·s (1150 cps), and was used without further modification.

Example 4

9 g of Ebecryl™ CL-1039 and 9 g of Ebecryl™ 111 were charged to a small reactor and stirred mechanically as the temperature was raised to 60° C. 4.5 g of diacetone acrylamide and 1.5 g of t-butyl acrylamide were added while stirring continued. After dissolution was complete, 6 g of Acryloid™ B-67 was added with stirring. The mixture was stirred for one hour at 60° C. to produce a clear solution. After cooling to room temperature, the solution had a viscosity of 1.19 Pa·s (1190 cps), and was used without further modification.

Example 5

9 g of Ebecryl™ CL-1039, 10.5 g of Ebecryl™ 111 and 7.5 g of Ebecryl™ 230 were charged to a small reactor and stirred mechanically as the temperature was raised to 60° C. 7.5 g of Acryloid™ B-67 was added with stirring. The mixture was stirred for one hour at 60° C. to produce a clear solution. The mixture was cooled to room temperature used without further modification.

Comparative Example C6

9 g of Ebecryl™ CL-1039 and 7.5 g of AOME were charged to a small reactor and stirred mechanically as the temperature was raised to 60° C. 4.5 g of diacetone acrylamide and 1.5 g of t-butyl acrylamide were added while stirring continued. After dissolution was complete, 7.5 g of Acryloid™ B-67 was added with stirring. The mixture was stirred for one hour at 60° C. to produce a clear solution. The mixture was cooled to room temperature and used without further modification.

Example 7

The adhesives from examples 1–6 were coated to a thickness of 0.2 mm (0.008 inch) onto 0.05 mm (0.002 inch) thick PET, then covered with a second sheet of 0.05 mm (0.002 inch) thick PET. Coating was performed at the temperatures shown in the table below. The resulting laminate was exposed to electron beam radiation at a voltage of 175 kV to a dose of 30 kGy (3 Mrad) on each side. (It is believed that attenuation of the 175 kV electron beam through a sample of this thickness is such that exposing from each side under these conditions results in a uniform dose of 30 kGy (3 Mrad) throughout the volume of the adhesive).

10 mm×20 mm samples were cut from the resulting cured laminates, and clamped in a single cantilever sample fixture on a dynamic mechanical analyzer. Dynamic mechanical analysis was carried out at 1 Hz over the temperature range −50 to +120° C., and peaks in the tan delta curve were taken to be glass transition temperature(s). Results are summarized in the following table:

| Adhesive | Temperature of Coating | Glass Transition Temperature(s) |
|---|---|---|
| comparative example C1 | 60° C. | 16° C. |
| comparative example C2 | 60° C. | 23° C. |
| example 3 | 20° C. | 38° C., 61° C. |
| example 4 | 20° C. | 29° C., 61° C. |
| example 5 | 35° C. | 1° C., 46° C. |
| comparative example C6 | 20° C. | 38° C. |

Example 8

The adhesives from examples 1–6 were continuously coated to a coat weight of 1.8 g/m$^2$ (1.2 lb/ream) onto 92 gauge untreated PET. Following coating, a 0.05 mm (0.002 inch) film of corona treated sealant film was laminated on top of the liquid adhesive. The resulting laminate was exposed through the sealant film to electron beam radiation at a voltage of 175 kV to a dose of 30 kGy (3 Mrad). t-peel adhesion was evaluated on an Instron Universal Testing machine model TM on (25.4 mm) (1 inch) wide strips at a cross head speed of 4.2 mm/sec (10 inches per minute) at both 20° C. and 60° C. Results in grams of force are summarized in the following table:

| Adhesive | t-peel, 20° C. (g) | t-peel, 60° C. (g) |
|---|---|---|
| example C1 | 308 | 38 |
| example C2 | 241 | 50 |
| example 3 | 400 | 359 |
| example 4 | 202 | 392 |
| example 5 | 295 | 200 |
| example C6 | 134 | 199 |

Comparative examples C1 and C2 exemplify single Tg formulations which give some performance at room temperature, but which do not stand up to elevated temperature. Examples 3,4 and 5 show formulations which exhibit dual Tg's and good performance at two different temperatures. Comparative example C6 shows a formulation similar to 3, 4 and 5, but which has poor monomer choice due to inclusion of AOME, such that phase separation does not occur. Like examples 1 and 2, only one Tg is noted, and performance was mediocre at both testing temperatures.

Example 9

3% by weight Darocure™ 1173 is added to the adhesive of example 3. The resulting adhesive is continuously coated to a coat weight of 1.8 g/m$^2$ (1.2 lb/ream) onto 92 gauge untreated PET. A 0.05 mm (0.002 inch) film of corona treated sealant film is then laminated on top of the liquid adhesive. The resulting laminate is exposed to ultraviolet light to a dose of 500 mJ/cm$^2$ and shows t-peel adhesion of greater than 300 g/25.4 mm (300 g/inch) at both 25° C. and 60° C. This example demonstrates using alternative radiation source for curing.

Example 10

3% by weight 2,2'-azobis-(2-methylbutyronitrile) is added to the adhesive of example 3. The resulting adhesive is continuously coated to a coat weight of 1.8 g/m$^2$ (1.2 lb/ream) onto 92 gauge untreated PET. A 0.05 mm (0.002 inch) film of corona treated sealant film is then laminated on top of the liquid adhesive. The resulting laminate is heated to 80° C. for six hours. The resulting laminate shows t-peel adhesion of greater than 300 g/25.4 mm (300 g/inch) at both 25° C. and 60° C. This example demonstrates using thermal curing.

Example 11

The adhesive of example 3 is coated onto a wooden board to a thickness of 0.05 mm (0.002 inch). A plastic film is applied over the wet adhesive, and the resulting coated board is exposed to an electron beam to a dose of 30 kGy (3 Mrad). The resulting composite is well bonded over a wide temperature range and is attractive and low in cost. This example shows that the invention is suitable for bonding of rigid as well as flexible materials.

I claim:

1. A composite article comprising a first substrate, a polymeric adhesive composition displaying at least two glass transition temperatures, and at least one subsequent substrate, wherein said composite article is formed by a process comprising:

(a) applying a layer of a homogeneous fluid comprising at least one polymerizable compound to said first substrate, (b) contacting said layer to said subsequent substrate to form an uncured assembly, and (c) exposing said uncured assembly to at least one polymerization condition selected from the group consisting of elevated temperature, radiation, and combinations thereof, wherein said adhesive composition has t-peel values at 4.2 mm/sec of 200 g per 25.4 mm of width or higher at 20° C. and of 200 g per 25.4 mm of width or higher at 60° C., and wherein said homogeneous fluid comprises 5% to 50% by weight, based on the weight of said homogeneous fluid, at least one acrylic polymer.

2. The composite article of claim 1, wherein said homogeneous fluid comprises 50% to 95% by weight, based on the weight of said homogeneous fluid, at least one polymerizable compound.

3. The composite article of claim 1, wherein at least two of said glass transition temperatures of said polymeric adhesive composition are separated from each other by 10° C. or more.

4. The composite article of claim 1, wherein said polymerization condition comprises electron beam radiation.

5. The composite article of claim 1, wherein said homogeneous fluid comprises 50% to 95% by weight, based on the weight of said homogeneous fluid, at least one polymerizable compound; wherein at least two of said glass transition temperatures of said polymeric adhesive composition are separated from each other by 10° C. or more; and wherein said polymerization condition comprises electron beam radiation.

6. A method for forming a composite article comprising (a) applying a layer of a homogeneous fluid comprising at least one polymerizable compound to at least one first substrate, wherein said homogeneous fluid has viscosity of 10 Pa·s or less at 60° C., (b) contacting said layer of said homogenous fluid to at least one subsequent substrate to form an uncured assembly, and (c) exposing said uncured assembly to at least one polymerization condition selected from the group consisting of elevated temperature, radiation, and combinations thereof;

wherein, subsequent to exposure of said uncured assembly to said polymerization condition, a polymeric adhesive composition displaying at least two glass transition temperatures has formed, wherein the weight of said polymeric adhesive composition is at least 10% of the weight of said layer of said fluid in said uncured assembly, and wherein said homogeneous fluid comprises 5% to 50% by weight, based on the weight of said homogeneous fluid, at least one acrylic polymer.

7. The method of claim 6, wherein said homogeneous fluid comprises 50% to 95% by weight, based on the weight of said homogeneous fluid, at least one polymerizable compound; wherein at least two of said glass transition temperatures of said polymeric adhesive composition are separated from each other by 10° C. or more; and wherein said polymerization condition comprises electron beam radiation.

8. A homogeneous fluid comprising at least one polymerizable compound, wherein said fluid forms, after exposure to radiation, a polymeric adhesive composition displaying at least two glass transition temperatures, wherein said homogeneous fluid has viscosity of 10 Pa·s or less at 60° C., and wherein said homogeneous fluid further comprises 5% to 50% by weight, based on the weight of said homogeneous fluid, at least one acrylic polymer.

9. The homogeneous fluid of claim 8, wherein said homogeneous fluid comprises 50% to 95% by weight, based on the weight of said homogeneous fluid, at least one polymerizable compound; wherein at least two of said glass transition temperatures of said polymeric adhesive composition are separated from each other by 10° C. or more; and wherein said polymerization condition comprises electron beam radiation.

* * * * *